United States Patent [19]

Eckels et al.

[11] Patent Number: 4,602,177
[45] Date of Patent: Jul. 22, 1986

[54] HOMOPOLAR GENERATORS WITH THERMOSYPHONS FOR IMPROVED COOLING

[75] Inventors: Phillip W. Eckels, Penn Hills Township, Allegheny County; Joachim V. R. Heberlein, Forest Hills Boro, both of Pa.

[73] Assignee: Westinghouse Electric Corp., Pittsburgh, Pa.

[21] Appl. No.: 684,437

[22] Filed: Dec. 20, 1984

[51] Int. Cl.[4] .............................. H02K 9/08
[52] U.S. Cl. ........................ 310/57; 310/59; 310/60 A; 310/67; 310/178; 165/32; 165/86
[58] Field of Search ............... 310/10, 52, 53, 54, 310/57, 58, 59, 60 A, 61, 64, 60 R, 178, 219, 232, 156, 261, 248; 165/32 HV, 86; 62/55, 505; 416/96 R

[56] References Cited

U.S. PATENT DOCUMENTS

| | | | |
|---|---|---|---|
| 2,883,151 | 4/1959 | Dolida | 416/96 R |
| 3,621,908 | 11/1971 | Pravda | 310/54 UX |
| 4,101,793 | 7/1978 | Berthet | 310/52 |
| 4,174,483 | 11/1979 | Vinokurov | 310/52 |
| 4,271,369 | 6/1981 | Stillwagon | 310/232 |
| 4,315,172 | 2/1982 | Intichar | 310/53 |
| 4,319,149 | 3/1982 | Eckels | 310/52 |
| 4,356,700 | 11/1982 | Eckels et al. | 310/54 UX |
| 4,365,479 | 12/1982 | Weghaupt | 62/505 |
| 4,368,397 | 1/1983 | Schnapper | 310/52 |
| 4,396,847 | 8/1983 | Weghaupt | 310/52 |

OTHER PUBLICATIONS

Unipolar Generator; E. H. Myers; Westinghouse Engineer; pp. 59–61; 3/1956.
Heat Transfer Characteristics of a Closed Loop Rotating Thermosyphon; pp. 172–181; 1966; I. Mech. E.; Japikse, pp. 106–111.
Solid Brush System Evaluation for Pulsed High Current Applications; Taylor and Hannan; pp. 151–162; 11/5/81.

Primary Examiner—R. Skudy
Attorney, Agent, or Firm—G. H. Telfer

[57] ABSTRACT

A high current density component of a dynamoelectric machine rotor is cooled by the use of thermosyphons that carry heat from the heat generating element to a cooler part of the rotor. A homopolar generator is shown with a rotor having a core covered by a copper shell that when so cooled by thermosyphons can be operated with substantially longer pulse intervals than previously.

13 Claims, 4 Drawing Figures

HOMOPOLAR GENERATORS WITH THERMOSYPHONS FOR IMPROVED COOLING

BACKGROUND AND SUMMARY OF THE INVENTION

This invention relates to dynamoelectric machines such as homopolar generators, whose capability can be much improved by the use of thermosyphons for cooling.

Homopolar generators are a long known type of dynamoelectric machine presently having renewed interest as pulsed power sources with characteristics of producing large magnitude direct currents at low voltage. Briefly and generally, such a machine has a stator with a magnetic core and some field excitation with a rotor that has a central magnetic core for flux path continuity and also one or more highly conductive elements on its surface in which unipolar current is induced during rotation of the rotor by some sort of prime mover. In recent designs the rotor conductor is essentially a cooper shell on the outside of and insulated from the rotor core. On the surface of the copper shell rides a large array of current collection brushes. The temperature rise of the brushes and shell have limited the current pulse interval to seconds or less. Restrictions result from brush life degradation and distortion of the copper shell at elevated temperatures. Various forms of cooling have been used or proposed to try and permit more continuous operation of the machine for greater duration of current pulses. These have so far been largely unsuccessful in substantially increasing the pulse interval. The eventual goal is to get pulses of durations of minutes or tens of minutes in magnitudes of millions of amperes. Much improved cooling techniques are required to do so. As background for homopolar pulse generators with solid brush systems and the attendant pulse interval limitations resulting from thermal effects, reference is made to an article by Taylor et al., entitled "Solid Brush System Evaluation for Pulsed High Current Applications" in Wear, 78 (1982) 151–162, which is herein incorporated by reference.

In accordance with the present invention, an improved method of cooling dynamoelectric machines such as the aforementioned homopolar generators is provided using the high acceleration field of rotation of the rotor to induce circulation in thermosyphons located in the rotor. Thermosyphons are generally known in various types of rotating apparatus such as is described in *Advances in Heat Transfer*, Vol. 9, Irvine et al., Ed., Academic Press, 1973, article titled "Advances in Thermosyphon Technology" by D. Japikse, pp. 2–106, which is incorporated by reference herein. One or more thermosyphons are used in the rotor of the apparatus to accept heat, such as that generated in the copper shell of the homopolar generator, and to distribute that heat to a cooler radially inward rotor portion. The thermosyphon is a passageway, such as one of a tubular configuration having a circular cross section, which may have a configuration such as that in which a first leg is disposed parallel to the rotor axis in the radially outward portion of the rotor, a second leg is disposed radially outward and a third leg is disposed parallel to the axis in a radially inward portion of the rotor. A fluid coolant in the passageway is influenced by rotation and thermal effects to circulate from the outer portion to the inner portion of the rotor and to return in a closed loop. A number of such thermosyphons can be arranged circumferentially about the rotor so that all portions that need to be cooled, such as the copper shell of the homopolar generator, can be effectively cooled ensuring against distortion of the shell and against undue brush deterioration so as to permit much longer term pulse intervals from the machine.

In further refinements of the invention the passageway of the thermosyphon has a flow divider extending along its length except for the ends of the passageway so that the fluid in its closed loop circulation does not tend to intermix. Additional features include a twist portion of the flow divider so that the maximum use is made of the available buoyant energy that drives the flow. In addition, there is a convection trap, which may be a bump or other nonuniformity on the flow divider, to provide a positive unbalance to the flow channels to assure proper starting of the thermosyphon in operation. These and other aspects of the invention are more fully described hereinafter so that it will be seen that the invention offers marked improvement in the cooling of dynamoelectric machines and can be applied in a variety of ways.

DESCRIPTION OF THE PREFERRED EMBODIMENTS

Figure 1:
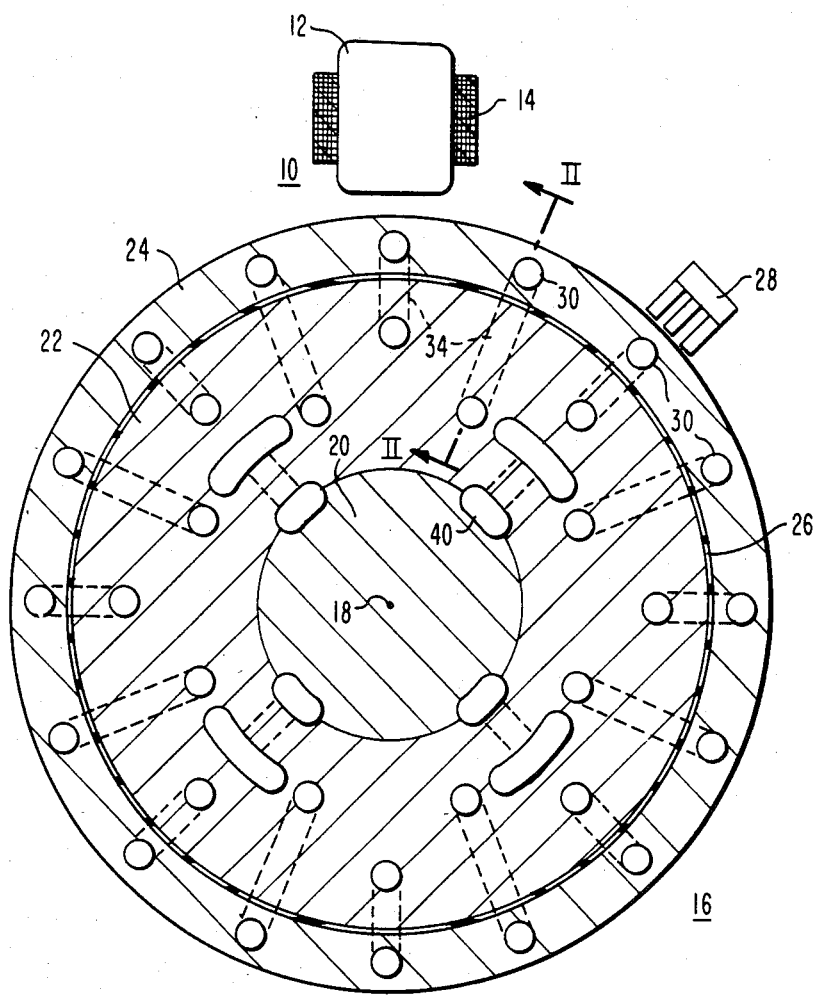
FIG. 1 is a cross-sectional view of a dynamo-electric machine in accordance with an embodiment of the present invention.

FIG. 1 shows a homopolar generator embodying the invention. A stator 10 of the generator has a magnetic core 12 with one or more field coils 14 thereon and a rotor 16 is located for rotation about an axis 18 in relation to the stator 10. The rotor 16 comprises a shaft 20 on which a magnetic core 22 is mounted with a nonmagnetic shell 24 of a highly conductive material such as copper around the rotor core which may be a ferrous structure. A layer of electric insulation 26 is located between the rotor core 22 and the shell 24. A set of current collection brushes 28 is located in contact with the shell 24 for withdrawing current therefrom. Normally, brushes 28 are located proximate each axial end of the shell 24. The shell 24 may extend entirely over the core 22 or have a more limited axial extent, as by having core 22 extend over the whole end face 22a. The electromagnetic structure of the machine is substantially in accordance with known practice and may be varied from that illustrated in accordance with design practices for homopolar generators.

The inherent operation of the machine involves the production of very large currents in the copper shell 24 and thus a large amount of heat is generated which has to be removed effectively to avoid distortion of the shell and damage to the brushes 28 in order to achieve a desired duty cycle for the machine.

Figure 2:
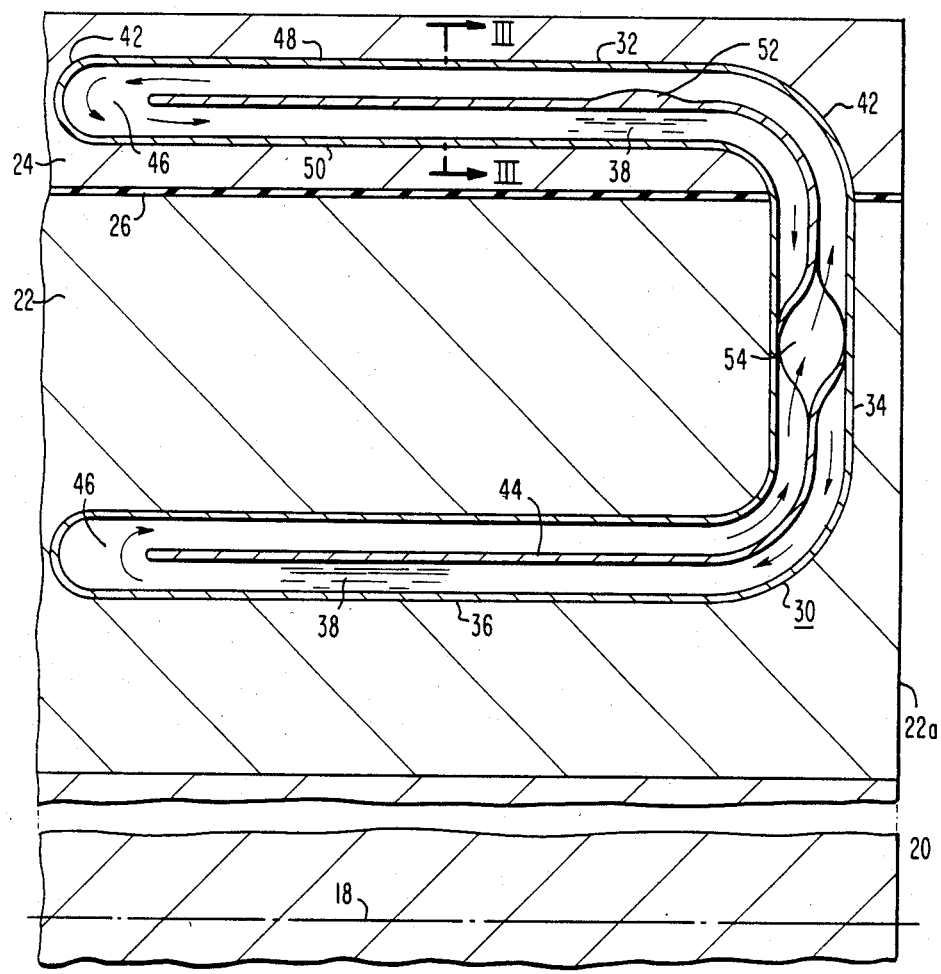
FIG. 2 is a view along the line II—II of FIG. 1.

In combination with the normally present elements the present invention introduces a plurality of thermosyphons 30 that in this example are arranged circumferentially about the rotor 16, each having a substantially U-shaped configuration as shown in FIG. 2 with a first leg 32 extending axially in the heat generating element or copper shell 24, a second leg 34 extending radially inward and a third leg 36 extending axially in the radially inward core portion 22 of the rotor. Each of the thermosyphons 30 is a passagway of such interconnected legs 32-34-36 and contains a coolant fluid 38 that is induced by the rotation of the rotor 16 to carry the heat from the shell 24 into the core 22 with the coolant circulating in closed loop therein.

As shown in FIG. 1, again by way of example, the radial or second leg 34 of a thermosyphon 30 may be varied in length to achieve a desired thermal distribution and, furthermore, there may be additional thermosyphons 40 located wholly within the core 22 or within the core and shaft 18 so as to more evenly distribute heat in that region. The cross-sectional view of thermosyphons 40 in FIG. 1 also shows that thermosyphon legs need not be circular, as shown for the outer thermosyphons 30.

Figure 3:
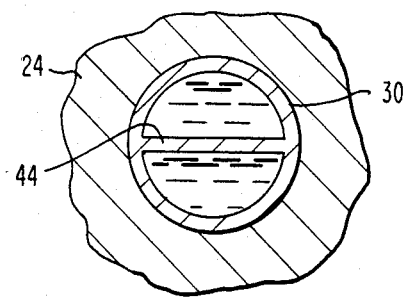
FIG. 3 is a view along the line III—III of FIG. 2.

FIGS. 2 and 3 shown in more detail the structural features of a thermosyphon 30 as may be applied in FIG. 1. The thermosyphon 30 has a generally U-shaped appearance as produced by the three mentioned legs 32-34-36 although it will also be apparent that it may take a more complex configuration with additional radial and axial legs to further distribute the heat.

Preferably, all portions of the passageway 30 are aerodynamically smooth, without sharp corners. Corners 42 are therefore rounded.

For convenience, reference numeral 30 is used to identify the entirety of a thermosyphon and also, in some contexts, refers to the passageway of the thermosyphon. The passageway 30 may be defined by material of the core 22 and shell 24 but, more preferably, is a tubular element of a heat conductor, such as aluminum or stainless steel, located within elements 22 and 24. Further variation can be provided by having part of the thermosyphon, such as radial leg 34, extend beyond the end face 22a.

Within the passageway 30 is a flow divider 44 that extends throughout the length of the passageway except for its end regions 46 at which there is communcation as shown between a radially outer and radially inner channels 48 and 50, respectively. The passageway flow divider 44 is a structural member mounted across the passageway 30, such as depicted in FIG. 3, that is preferably oriented substantially in a plane perpendicular to a radius from the axis 18. The utilization of the flow divider 44 provides distinct channels for the bidirectional flow in the passageway 30 so as to prevent choking or severe mixing of the streams that could reduce the effectiveness of heat transfer by the fluid. The arrows in FIG. 2 indicate flow direction for this example. Also, the divider 44 itself is preferably of a low thermal conductivity material to prevent internal thermal shorting. Such a material may be, for example, stainless steel or a fiber reinforced polymer.

Another feature of the flow divider 44 as illustrated in FIG. 2 is a convection trap 52 that is a nonuniformity on one side of the flow divider. Here the convection trap 52 is a smooth bump that modifies the cross section of one channel 48 in relation to the other channel 52 in a small region of the first leg 32. The convection trap 52 provides a positive unbalance to the flow channels 48–50 to assure proper starting of the thermosyphon. Essentially the same effect can be provided by having the convection trap 52 located on the wall of the passageway 30 other than the divider 44 itself. The utilization of a convection trap is a highly desirable aspect of the present invention that, although wholly new in its application here, is somewhat similar to part of a superconducting rotor cooling arrangement in Eckels U.S. Pat. No. 4,319,149, Mar. 9, 1982.

Convection trap 52 is shown in its preferred location in the first leg 32 proximate the turn into radial leg 34, and in the channel 48 closest to the radial outer surface of shell 24 were heat is generated. As such, convection trap 52 induces coolant flow in the direction shown. From a thermodynamic standpoint, convection trap 52 interrupts the thermal boundary layer of the fluid 38 on the side of divider 44 in channel 48.

Another desirable feature is for the flow divider 44 to have a 180° twist region 54. As shown here the twist region 54 is in the radially extending leg 34 and serves to move fluid from the radially outward channel 48 of the bottom or third leg 36 to the radially outward channel of the top or first leg 32 and in so doing maximizes the use made of the available buoyant energy that drives the flow. The twist 54 causes hotter fluid to flow in radially inward channel 50, as compared to channel 48, in both axial legs 32 and 36, which is desirable for thermal efficiency.

Each thermosyphon 30 uses a circulating fluid medium that may be a single phase (supercritical) or a two phase (boiling) fluid. Helium or hydrogen are suitable choices for use as the fluid, although others may be also selected. It is desirable to use the maximum amount of fluid that can be readily provided without encountering undue mechanical stresses due to a pressure rise in operation. This may be about 150 atmospheres.

As shown each thermosyphon 30 is permanently sealed with the fluid 38 therein. This is not essential for a thermosyphon in general as they may be provided with inlets and outlets from and to an exterior supply but such complexity would be normally adverse to desirable qualities of a machine rotor. It is believed the arrangement as presented can be quite effective without that extra complication. With a distribution of thermosyphons 30 between the shell 24 and core 22 as shown in FIG. 1 and internal heat distribution thermosyphons, or key slot thermosyphons 40, as shown in the interior of the rotor 16, it is estimated that the improved distribution of heat from the rotor conductor permits increasing the pulse length or operation time to a period of one to two minutes as opposed to tenths of minutes as were heretofore achievable with similar structures that are cooled by conventional internal conduction.

Figure 4:
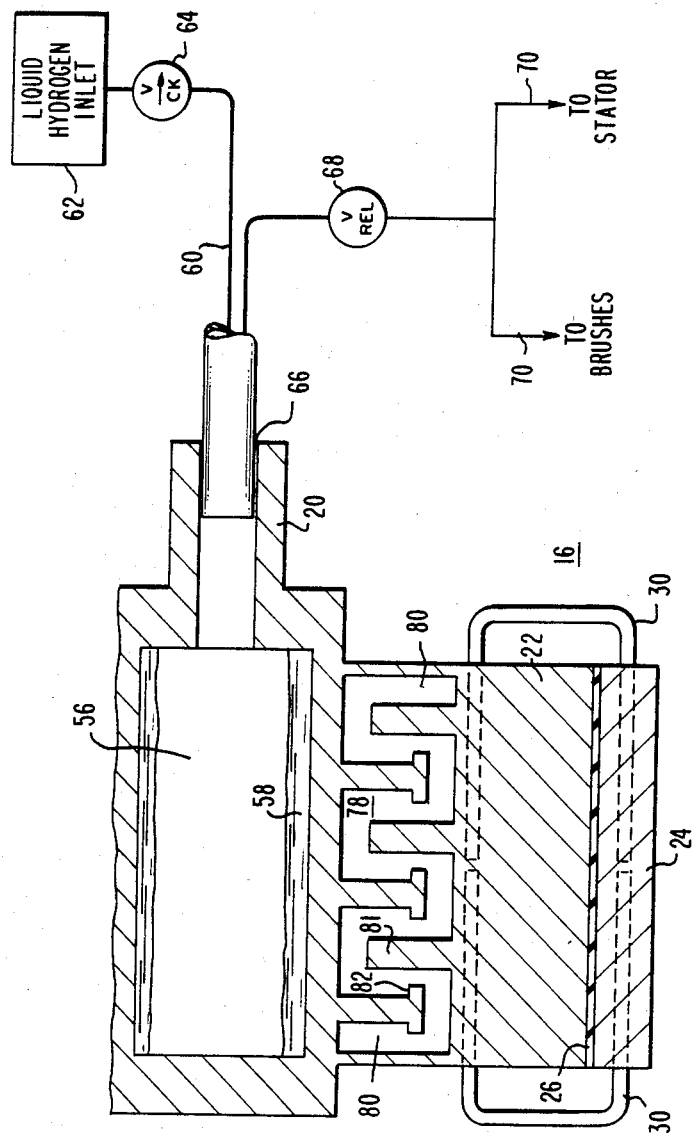
FIG. 4 is a cross-sectional view of a further embodiment of the invention.

With additional features it is believed that the pulse length can be substantially further lengthened. FIG. 4 shows a further embodiment in which the rotor 16 has thermosyphons 30 between the copper shell 24 and the core portion 22 substantially as previously shown but with additionally a rotor inner bore 56 containing a coolant 58 such as liquid hydrogen. A transfer circuit 60 is schematically illustrated for introducing the coolant 58 into the inner bore 56 which serves as a reservoir and withdrawing vapor from it. The liquid hydrogen operates in a manner similar to liquid helium in superconductive rotors. The coolant 58 takes heat from the bore surface and as it is heated vaporizes and is ejected.

The transfer circuit 60 includes conduits for coolant 58 from a liquid supply inlet 62 through a check valve 64 to a rotating transfer coupling 66. The transfer coupling 66 may be similar to that used for helium transfer in superconductive rotors; see, for example, Eckels et al. U.S. Pat. No. 4,356,700, Nov. 2, 1982. The outlet for vapor from the coupling 66 goes through a pressure relief valve 68 to outlets 70 for the brushes 28 and stator 10 as described below.

Two other aspects are illustrated in FIG. 4. One is the provision of thermal switches 78 for temperature regulation if it is required to conserve coolant while the machine is not in operation. The thermal switches 78 generally comprise a high thermal resistance heat flow path that is bridged or shunted by a convective flow path whose heat transport media becomes very viscous or immobile at low heat loads and speeds. One such high resistance path is shown in FIG. 4 as the open chamber region 80 separating the inner rotor structure or shaft 20 and outer rotor structure 22. If chamber 80 is filled with helium, little heat is transferred to the coolant in the bore at idle speed or standstill due to reduced convection. Heat transfer is improved as rotor speed increases.

Another alternative applicable to FIG. 4 is the use of freeze-out thermosyphons to substantially insulate the coolant in the bore during rest intervals. Thermosyphons using two gases, such as nitrogen and helium, could be used to vary the thermal response of the reservoir 56. To implement the freeze-out feature, the chamber 80 would contain nitrogen with lesser amounts of helium. At idle the nitrogen would cryopump and freeze on the surfaces 82 of the pins 81. Under load, the temperature rise of pins 81 would warm the surface 82, evaporating nitrogen and significantly increase the quantity of convective media available for heat transport between members 22 and 20.

In addition, the apparatus of FIG. 4 can be utilized for further cooling because the pressure surge created in the rotor bore 56 resulting from the boiling of liquid hydrogen causes a surge in flow through the outlets 70 that may be directed to the brushes 28 and stator 10 (FIG. 1) for effective cooling thereof if the stator is not otherwise independently cooled sufficiently, such as by cryogenic spray or mist cooling. This therefore represents an illustration of how building upon the utilization of thermosyphons for the primary cooling function in relation to the copper shell there can be additional cooling means provided that improves overall machine characteristics. Thus the invention provides improved design freedom for homopolar generators for high current pulse applications where the pulses can endure for a substantially longer period than previously and yet does not require elaborate control systems for effective utilization.

Further modifications and variations of the implementation of the invention may be practiced from the general description provided herein.

What we claim is:

1. A dynamoelectric machine comprising:
   a stator;
   a rotor having a substantially cylindrical mass arranged for rotation about an axis in relation to said stator;
   means for distributing heat produced in said rotor mass during operation of the machine comprising at least one passageway within said mass having at least three interconnected legs including a first leg oriented substantially parallel to said axis, a second leg oriented substantially perpendicular to said axis, and a third leg oriented substantially parallel to said axis radially inward from said first leg, said passageway having a flow divider extending proximate the center thereof and dividing substantially the entirety of said passageway into two substantially parallel open portions that are interconnected at ends of said passageway remote from each other to permit circulation of a fluid coolant in a loop including each of said two parallel portions in each of said legs.

2. A dynamoelectric machine in accordance with claim 1 wherein:
   said passageway is a sealed tubular volume containing a quantity of the fluid coolant that is induced by rotation of said rotor and by generation of heat during operation of the machine to circulate therein and to distribute heat from a first, hotter portion of said rotor mass to a second, cooler portion of said rotor mass.

3. A dynamoelectric machine in accordance with claim 2 wherein:
   said flow divider has a twist portion for directing coolant flow transversely across said passageway between said two portions thereof.

4. A dynamoelectric machine in accordance with claim 2 wherein:
   said flow divider has a convection trap portion for partially interrupting a limited flow region in one of said portions of said passageway to create a positive imbalance in said two portions of said passageway to assure starting of fluid circulation in operation.

5. A dynamoelectric machine in accordance with claim 1 wherein:
   said stator and said rotor are elements of a homopolar generator;
   said rotor mass comprises a radially inner portion of a magnetic material and a radially outer portion of a nonmagnetic material with a layer of electrical insulation material therebetween, said outer portion of nonmagnetic material is contacted by a number of current collection brushes;
   said passageway first leg is disposed in said radially outer portion of said rotor mass and said passageway third leg is disposed in said radially inner portion of said rotor mass.

6. A homopolar generator comprising:
   a stator comprising a magnetic stator core and one or more field coils on said core;
   a rotor located for rotation abut an axis in relation to said stator and comprising a magnetic rotor core and a nonmagnetic shell of more highly conductive material around said rotor core with a layer of electrical insulation between said rotor core and said shell;
   a set of brushes in contact with said shell for collecting current therefrom;
   means for distributing heat generated in said shell for improving the operative capability of said brushes and comprising a plurality of thermosyphons distributed circumferentially about said rotor, each of said thermosyphons comprising a sealed tubular passageway extending through said core and said shell and containing a quantity of a coolant fluid that circulates therethrough under the influence of said rotor's rotation and thermal characteristics;
   each of said thermosyphon passageways having at least three interconnected legs including a first leg in said shell substantially parallel to said rotor axis, a second leg extending from said shell to said core substantially perpendicular to said rotor axis, and a third leg in said core substantially parallel to said rotor axis, a flow divider extending across said passageway dividing substantially the entirety of said passageway into distinct flow channels interconnected at ends of said passageway with a twist portion of said flow divider intermediate said ends of said passageway for redirecting flow from a first of said flow channels to a second thereof, and a convection trap comprising a nonuniformity on a surface of one of said flow channels to assure reliable starting of circulation of said coolant fluid in said passageway during operation.

7. A hompolar generator in accordance with claim 6 wherein:
said convection trap is located in said first leg proximate said second leg.

8. A homopolar generator in accordance with claim 7 wherein:
said convection trap is located in a radially outermost one of said flow channels.

9. A dynamoelectric machine with provision for improved cooling and comprising:
a stator;
a rotor mounted on an axis for rotation in relation to said stator;
a plurality of closed tubular thermosyphons in said rotor containing a fluid medium and arranged for distributing heat from a region of heat generation of said rotor to a cooler region by circulation of said fluid medium due to rotation of said rotor;
said rotor having an inner bore along said axis;
a transfer circuit for introducing a liquid coolant into, and withdrawing vapor from, said inner bore for further cooling of said rotor in addition to that provided by said thermosyphons.

10. A dynamoelectric machine in accordance with claim 9 further comprising:
a plurality of thermal switches located in said rotor between said thermosyphons and said inner bore, said thermal switches comprising means for providing a high thermal resistance heat flow path shunted by a convective heat flow path that improves heat transfer as rotor speed increases.

11. A dynamoelectric machine in accordance with claim 10 wherein:
said thermal switches include a chamber containing a heat transport medium.

12. A dynamoelectric machine in accordance with claim 11 wherein:
said heat transfer medium in said chamber contains a first constituent that freezes onto surfaces of said chamber when said rotor is at idle due to the cooling effect of a second constituent, said first constituent being evaporated when said rotor is operating under load to improve heat transfer.

13. A dynamoelectric machine in accordance with claim 9 wherein:
said transfer circuit further includes means for directing vapor withdrawn from said rotor bore to cool said stator.

* * * * *